United States Patent [19]
McCleerey et al.

[11] Patent Number: 5,944,561
[45] Date of Patent: Aug. 31, 1999

[54] ELECTRICAL CONNECTOR AND COVER ASSEMBLY

[75] Inventors: Earl William McCleerey, Mechanicsburg, Pa.; Michael Albert Viselli, Vancouver, Wash.; Timothy Lee Kocher, Camp Hill, Pa.; Michael Chung-Ta Chiang, Harrisburg, Pa.; Navin Kanjibhai Patel, Hummelstown, Pa.

[73] Assignee: The Whitaker Corporation, Wilmington, Del.

[21] Appl. No.: 08/899,457

[22] Filed: Jul. 23, 1997

Related U.S. Application Data

[60] Provisional application No. 60/022,831, Jul. 31, 1996.

[51] Int. Cl.$^6$ ...................................................... H01R 9/22
[52] U.S. Cl. ............................................ 439/718; 220/844
[58] Field of Search ...................................... 439/142, 144, 439/718; 220/844, 848

[56] References Cited

U.S. PATENT DOCUMENTS

| | | | |
|---|---|---|---|
| 3,760,335 | 9/1973 | Roberts | 339/99 R |
| 4,035,051 | 7/1977 | Guy | 339/103 R |
| 4,168,877 | 9/1979 | Little et al. | 339/103 M |
| 4,197,959 | 4/1980 | Kramer | 439/142 |
| 4,381,063 | 4/1983 | Leong | 439/142 |
| 4,456,145 | 6/1984 | Frank | 439/142 |
| 4,669,806 | 6/1987 | Fuchs | 439/712 |
| 4,985,962 | 1/1991 | Weber | 16/232 |
| 5,146,650 | 9/1992 | Robertson | 16/259 |
| 5,571,023 | 11/1996 | Anthony | 439/142 |

FOREIGN PATENT DOCUMENTS

| | | | |
|---|---|---|---|
| 0709924A2 | 5/1996 | European Pat. Off. | H01R 13/447 |
| 4125509C1 | 1/1993 | Germany | H02G 3/14 |
| 4309162A1 | 9/1993 | Germany | H01R 13/447 |
| 4316858A1 | 11/1993 | Germany | H02B 1/44 |

*Primary Examiner*—Neil Abrams
*Assistant Examiner*—Jean F. Duverne
*Attorney, Agent, or Firm*—Mary K. Vanatten; Katherine A. Nelson

[57] ABSTRACT

An electrical connector (20) having a cover (70) pivotally secured thereto includes a housing (22) having a base (42), opposed side walls (26), and end walls (32), together defining a terminal receiving cavity (68) and a plurality of terminals (90) disposed in at least two rows therein. The cover (70) includes a hinge receiving slot (76) extending along a common one of its elongate sides (72) and inwardly from each end thereof. The cover (70) is secured to the housing (22) by a pair of hinges (78) with a base (80) of each hinge retained within in a respective one of the cover slots (76) and the leading end (84) of a leg (82) of each hinge (78) pivotally mounted proximate a middle position of a respective one of the housing end walls (32) adjacent an entrance to the cavity (68). When the cover (70) is in its open position, the cover 70 can be rotated about the hinge bases (80) so that it is adjacent either one of the housing side walls (26) as desired thereby allowing access to a row of terminals (90) proximate the other side wall (26).

14 Claims, 4 Drawing Sheets

1

ELECTRICAL CONNECTOR AND COVER ASSEMBLY

This application claims the benefit of U.S. Provisional Application Ser. No. 60/022,831, filed Jul. 31, 1996.

FIELD OF THE INVENTION

The present invention is directed to electrical connectors and more particularly to an electrical connector having a cover that may be opened to permit work to be done on the terminals therein.

BACKGROUND OF THE INVENTION

Connectors having covers that can be opened to have access to the terminals therein for repairs or the like are known. In some instances the covers are mounted along one side of the housing and function similar to a door and may block access to some of the terminals within the connector. Other connectors such as the one disclosed in U.S. Pat. No. 5,146,650 have a latchable hinge that requires additional space at the hinged side of the connector to allow the cover to move completely away from the area in which the terminals are located. In some instances, such as in control panels, a plurality of connectors are mounted so closely together that there is insufficient space to accommodate a hinge such as shown in the '650 patent. It is desirable, therefore, to provide a connector having a cover that remains attached to the connector housing but can swing out of the area where the work is being done.

SUMMARY OF THE INVENTION

The present invention is directed to an electrical connector including a housing having a base, opposed side walls and opposed end walls that together define a terminal receiving cavity and a plurality of terminals disposed in at least two rows therein and a cover. The connector cover includes opposed elongate sides and ends and is dimensioned to extend over the terminal receiving cavity when in its closed position. The cover includes a hinge receiving slot extending inwardly from each of the ends and along a common one of the elongate sides. A pair of hinges secure the cover to the housing with a base of each hinge retained in a respective one of the slots of the cover and a leg of each hinge extending orthogonal from the hinge base at the end of the slot to a leading end. The leading end of each of the hinges is pivotally mounted proximate a middle position of a respective one of the housing end walls adjacent an entrance to the cavity with the legs having a length of substantially ½ the width of the cavity at the end wall. When the cover is closed access to the terminal receiving cavity is prevented and upon opening the cover the cover can be rotated about its hinge bases so that it is adjacent either one of the side walls as desired, thereby allowing access to a row of terminals proximate the other side wall.

In the embodiment shown, the hinges are formed at opposite ends of a common member. The hinge is made from a metal such as stainless steel or the like and is of sufficient diameter and strength such that when the cover is fully open and pulled to the center at its full extension, it is able to be used as the handle for removal of the connector from a control panel. When the cover is in its fully closed position, the wire hinge is hidden from view to protect the connector from electrostatic discharge (ESD).

An embodiment of the invention will now be described by way of example with reference to the accompanying drawings.

DETAILED DESCRIPTION OF AN EMBODIMENT OF THE INVENTION

Figure 1:
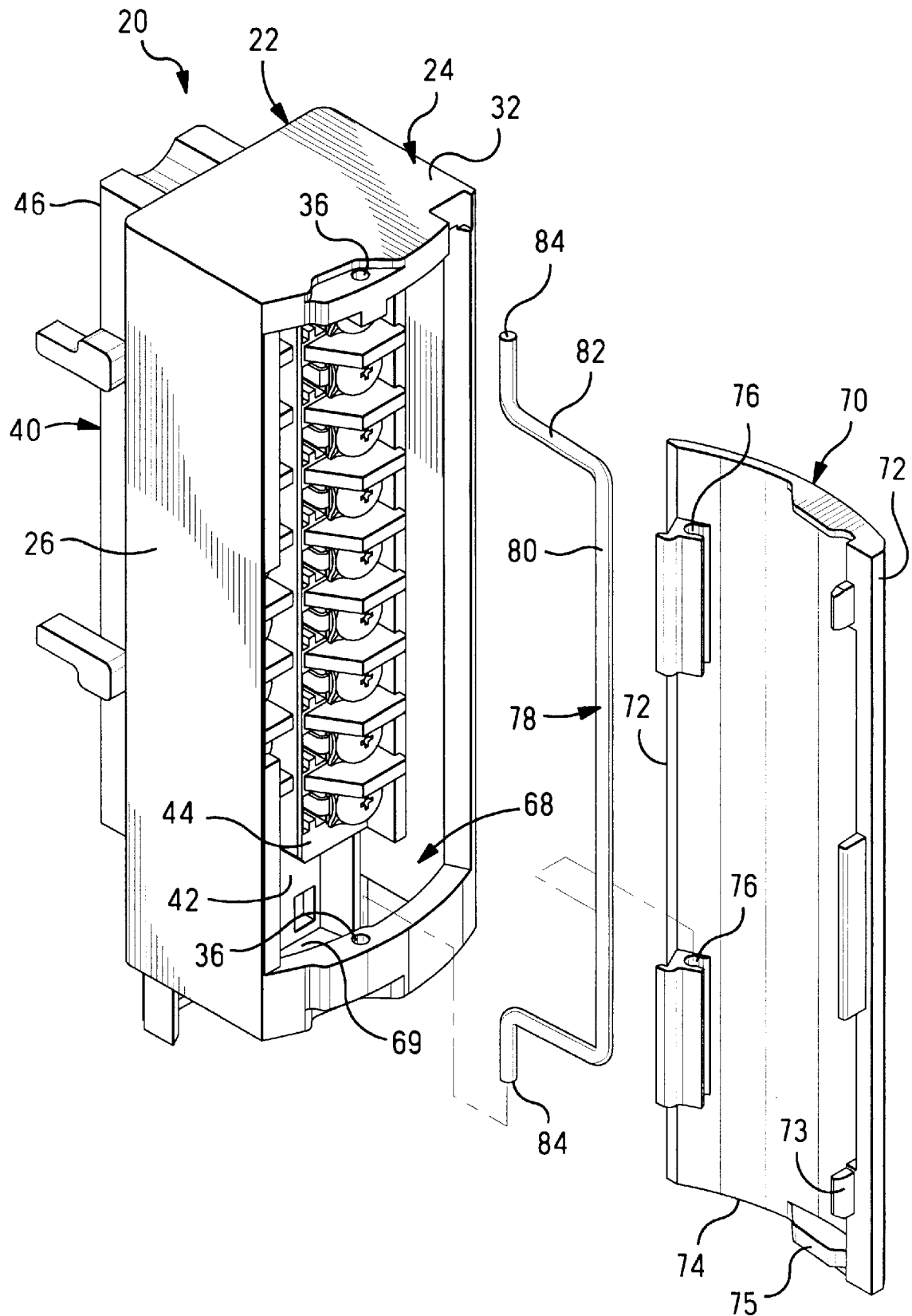
FIG. 1 is a pictorial representation of a connector having a cover made in accordance with the present invention with the parts exploded from one other.

For purposes of illustrating the invention, the cover will be shown mounted to a terminal block plug assembly having terminals therein that are adapted to be terminated to wires of a cable. Referring now to FIGS. 1 through 6, connector 20 includes a two piece housing 22 having shell 24 and a slidable terminal containing insert 40 secured thereto. The assembled housing 22 includes opposed side walls 26, opposed end walls 32, and base 42 together defining a cable and terminal receiving cavity 68. Base 42 includes a plurality of first terminal receiving passageways 60 extending from a cable terminating face 44 to a mating face 46 each including a terminal 90, which is adapted to be terminated to wires of a cable (not shown). As best seen in FIGS. 1 and 6, one end of the connector housing 22 includes a cable receiving opening 69.

Connector 20 further includes a cover 70 having opposed elongate sides 72 and opposed ends 74. Hinge receiving slots 76 extend inwardly from the ends 74 of the cover 70 along a common elongate side 72 thereof. The slots 76 are in alignment with each other. The cover 70 is pivotally mounted to the housing 22 by means of a hinge 78 at either end with a base 80 of each hinge being retained in a respective one of the slots 76 and a leg 82 of each hinge 78 extending orthogonally from the base 80 to a leading end 84 that is mounted in an aperture 36 proximate a middle position of a respective housing end wall 32. The leading ends 84 of the hinges are collinear, extend parallel to the respective hinge bases 84 at a common distance from the respective bases and in opposing directions to define a common pivoting axis. The leading end 84 of each hinge 78 is pivotally mounted to the housing end wall 32 adjacent an entrance to the cavity 68. The legs 82 of each hinge 78 has a length of substantially one/half the width of the cavity 68 at the end wall. The housing and cover are preferably made from suitable thermoplastic materials, as known in the art.

Figure 2:
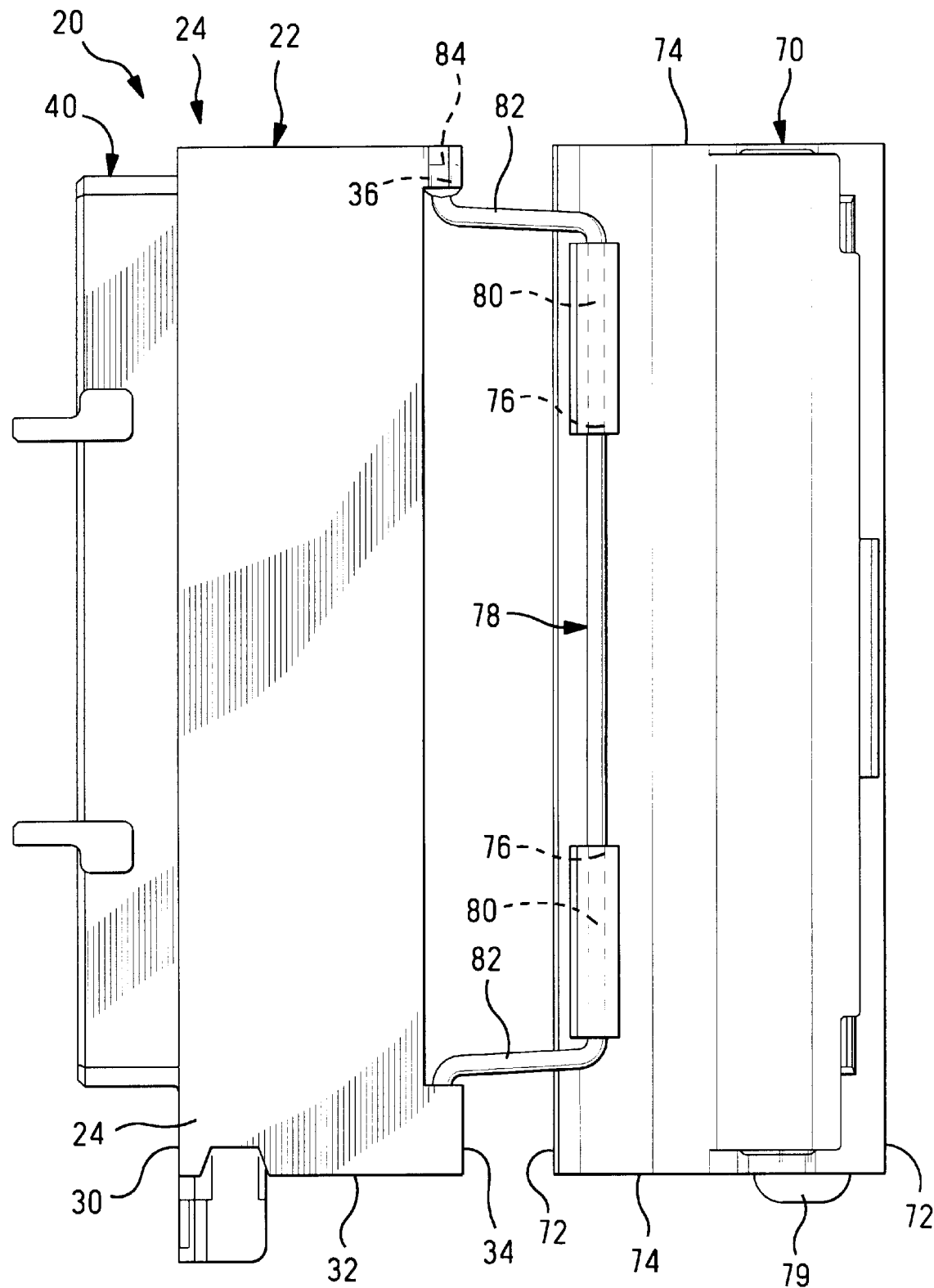
FIG. 2 is a side view of a connector having the cover assembled and extended at its full extension.

In the embodiment shown, the hinges are formed from a continuous wire member that extends along substantially the entire elongate side 72. In this embodiment, the hinge is made from stainless steel and has a diameter of about 2 mm. Alternatively the hinge may be made from plastic coated metal or a reinforced plastic to further protect the connector from electrostatic discharge. The cover 70 is dimensioned such that in its closed position access to cable terminal receiving cavity 68 is prevented. When the cover 70 is open and in its extended centered position, as shown in FIG. 2, the cover 70 may be used as a handle to remove the connector from a control panel. Additionally, a label may be affixed to the inside surface of cover 70 to identify the circuits being connected by connector assembly 20.

Figure 3:
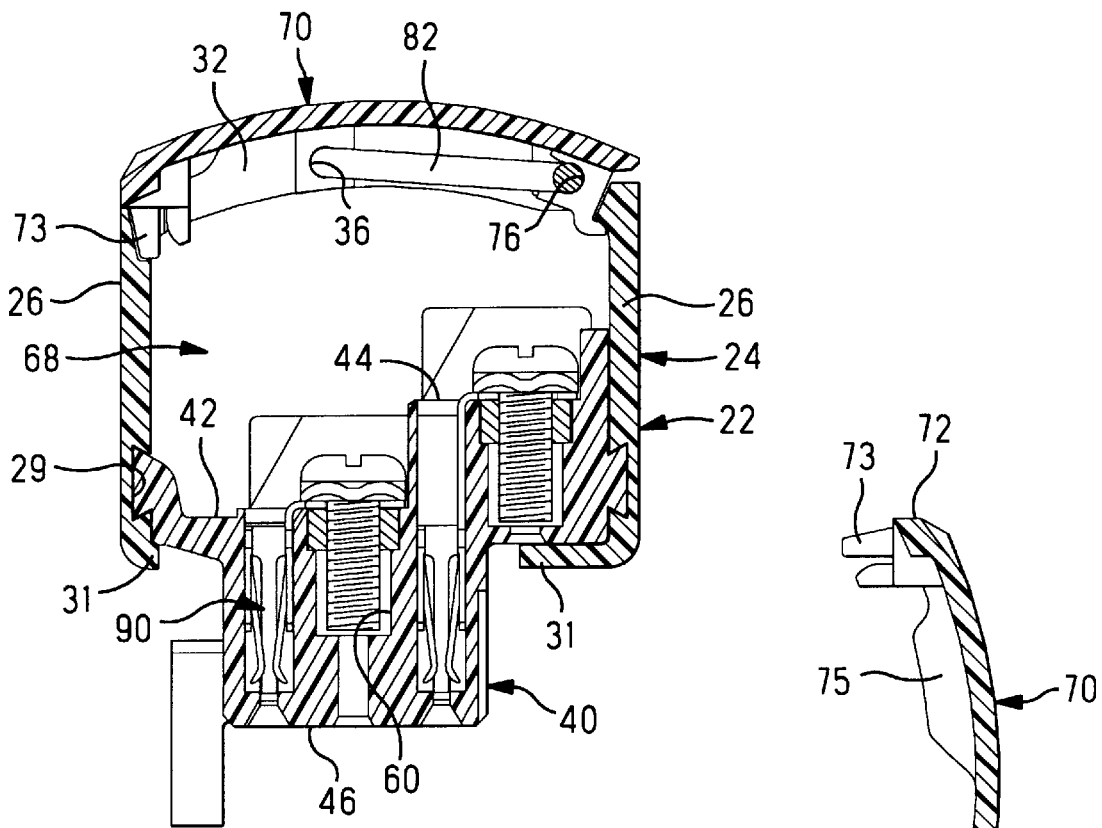
FIG. 3 is a cross-sectional view of a connector assembly showing the cover in its closed position.
Figure 4:
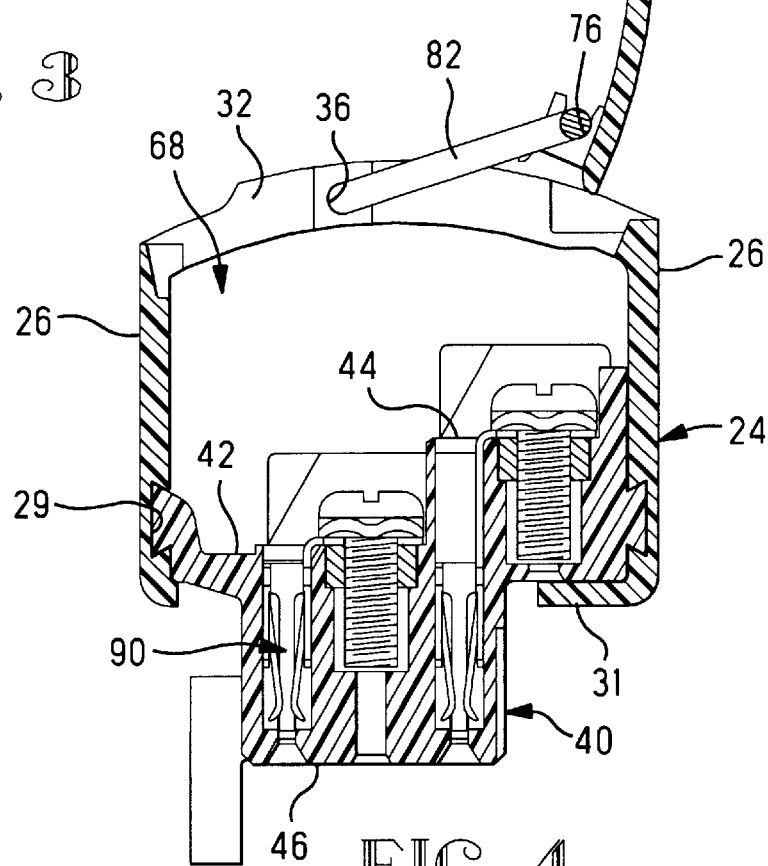
FIG. 4 is a cross-sectional view of the connector of FIG. 3 showing the cover in its open position and moved to the first side of the connector housing.
Figure 5:
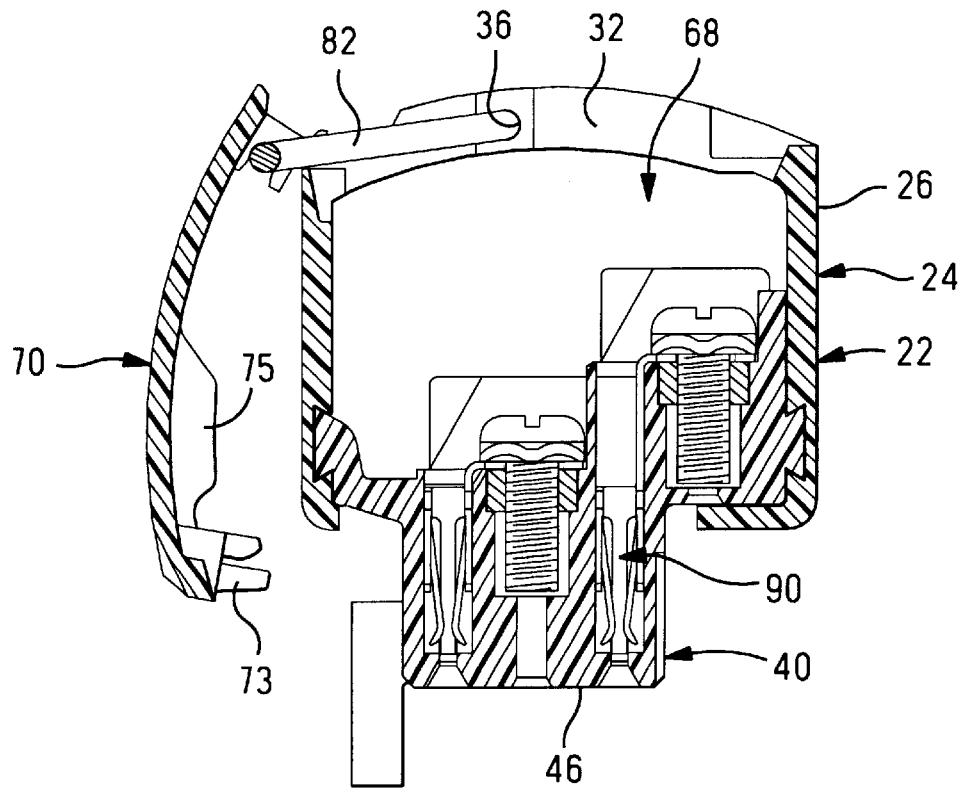
FIG. 5 is a view similar to that of FIG. 4 with the cover moved to the other side of the connector housing.
Figure 6:
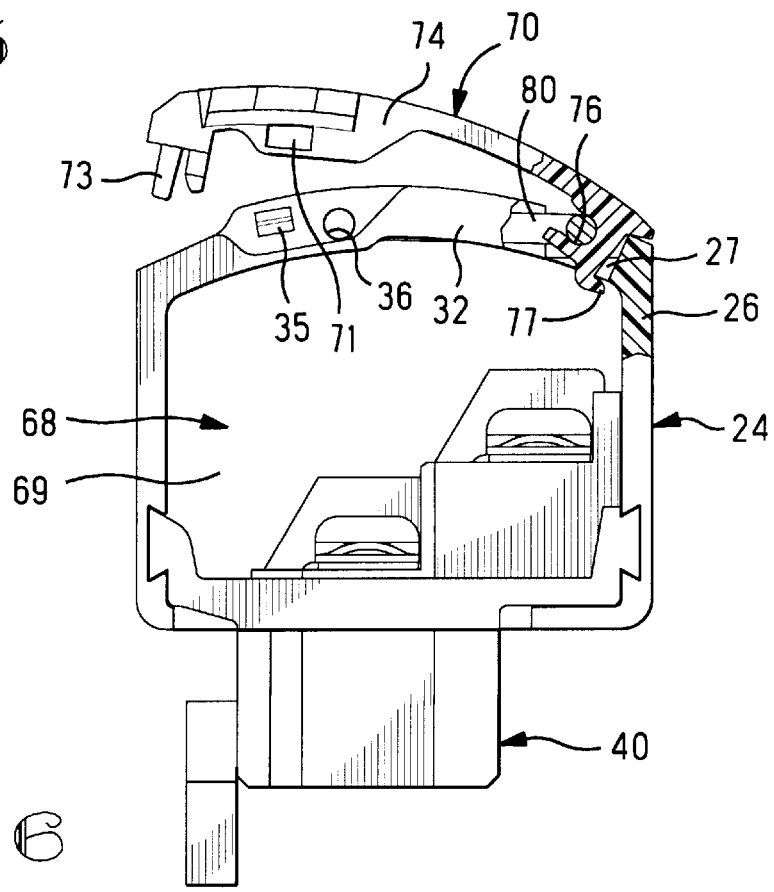
FIG. 6 is an end view of the connector assembly of FIG. 1 with portions of the cover and housing broken away and illustrating latching features of the invention.

The pivoting movement of the cover 70 with respect to the housing 22 is best seen by referring to FIGS. 3 through 5. FIG. 3 shows the housing 32 with the cover 70 closed such that access to the cable receiving cavity 68 is prevented. As can be seen in FIG. 3, the leg 82 of the hinge 78 extends approximately ½ of the width of the cavity 68 along the end wall 32. FIGS. 4 and 5 illustrate the open cover 70. When the cover 70 is pivoted to a first housing side wall 26, access is provided to the row of terminals 90 along the opposite side wall 26. When the cover 70 pivoted to the opposite side wall 26, the other row of the terminals 90 proximate the other side wall can be accessed. The cover 70 thus provides access to the respective rows of terminals 90 within the connector housing 22 without adding to the width of the connector body. Furthermore cover 70 can be used as a handle to remove the connector from a control panel.

FIG. 6 illustrates the latching features of the present invention, which latch the cover at at least one end wall and along the hinged side. At least one of the end walls 32 includes an outwardly extending protrusion 35 proximate the side wall 26 opposite the hinged side wall. The end 74 of cover 70 includes a protrusion-receiving recess 71 adapted to engage protrusion 35 to secure cover 70 to housing 22 when cover 70 is closed. FIG. 6 further shows how the cover 70 is secured along its hinged side. The elongate side 72 of the cover along which the hinges extend includes at least one latching lip 77 adapted to extend beneath a cooperating surface 27 along the housing side wall 26 when the cover 70 has been pivoted to a closed position with respect to the housing 22. Lip 77 and cooperating surface 27 latch the elongate side 72 of the cover 70 to the housing side wall 26, thus preventing the cover from being opened along the hinged side. In the embodiment as shown, cover 70 includes a pair of latching lips 77, each one being proximate one of the hinge receiving slots 76.

In the embodiment as illustrated, the cover 70 further includes one or more alignment tabs 73 positioned along the elongate sides 72 to align the cover 70 to the housing 22 when the cover is being closed. The ends 74 of the cover 70 may also be configured to include an extending portion 75 dimensioned to cover over the ends of the hinge 78 when the cover 70 is in its closed position to protect the connector 20 and terminals therein from electrostatic discharge (ESD). A tab 79 may also be provided at at least one end 74 of the cover 70 for ease of opening.

It is thought that the connector and cover of the present invention and many of its attendant advantages will be understood from the foregoing description. It is apparent that various changes may be made in the form, construction, and arrangement of parts thereof without departing from the spirit or scope of the invention, or sacrificing all of its material advantages.

We claim:

1. An electrical connector and cover comprising:
    a housing including a base, opposed side walls, and opposed end walls, together defining a terminal receiving cavity;
    a plurality of terminals disposed in at least two rows in said cavity;
    said cover having opposed elongate sides and ends and being dimensioned to extend over the terminal receiving cavity in its closed position, said cover including a hinge receiving slot extending inwardly from each of said ends and along a common one of said elongate sides, said slots being in alignment with each other;
    a pair of hinges securing said cover to said housing with a base of each said hinge retained within in a respective one of said slots of said cover and a leg of each said hinge extending orthogonally from said base thereof at an end of said slot to a leading end extending parallel to said base, said leading ends being collinear, a common distance from respective said bases and in opposing directions to define a common pivoting axis, said leading end of each said hinge being pivotally mounted proximate a middle position of a respective one of the housing end walls adjacent an entrance to said cavity, said legs of said hinges having a length of substantially one/half the width of said cavity at said end wall;
    whereby when said cover is in its closed position, access to said cavity is prevented, and upon opening said cover, said cover can be rotated about said hinge bases so that it is adjacent either one of said side walls as desired thereby allowing access to a row of terminals proximate the other side wall.

2. The connector and cover of claim 1 wherein said pair of hinges are at opposite ends of a common member.

3. The connector and cover assembly of claim 1 wherein said housing further includes at least one protrusion extending outwardly from at least one of the end walls proximate the side wall opposite the hinged side wall, and said cover includes a protrusion receiving recess adapted to engage said housing protrusion to secure said cover to said housing when said cover is closed.

4. The connector and cover assembly of claim 1 wherein said elongate side of said cover along which said hinges extend, further includes at least one latching lip adapted to extend beneath a cooperating surface along said housing side wall when said cover has been pivoted to a closed position with respect to said housing, to latch said elongate side of said cover to said housing side wall, thus preventing said cover from being opened along the hinged side.

5. The connector and cover assembly of claim 4 wherein said cover includes a pair of latching lips, each one being proximate one of said hinge receiving slots.

6. The connector and cover assembly of claim 1 wherein said cover further includes at least one alignment tab positioned along at least one of said side walls to align said cover to said housing when said cover is being closed.

7. The connector and cover assembly of claim 1 wherein at least one end of said cover further includes a downwardly projecting portion configured to cover an end of said hinge.

8. An electrical connector and cover assembly including a housing having a base, opposed side walls, and opposed end walls, together defining a terminal receiving cavity; a plurality of terminals disposed in at least two rows in said cavity; said cover having opposed elongate sides and ends and being dimensioned to extend over the terminal receiving cavity in its closed position, and said cover being hingedly secured to said housing; said assembly being characterized in that:
    said cover includes a hinge receiving slot extending inwardly from each of said ends and along a common one of said elongate sides, said slots being in alignment with each other; and
    a pair of hinges securing said cover to said housing with a base of each said hinge retained within in a respective one of said slots of said cover and a leg of each said hinge extends orthogonally from said base thereof at an end of said slot to a leading end extending parallel to said base, said leading ends being collinear, a common distance from respective said bases and in opposing directions to define a common pivoting axis, said leading end of each said hinge being pivotally mounted proximate a middle position of a respective one of the housing end walls adjacent an entrance to said cavity, said legs of said hinges having a length of substantially one/half the width of said cavity at said end wall;

whereby when said cover is in its closed position, access to said cavity is prevented, and upon opening said cover, said cover can be rotated about said hinge bases so that it is adjacent either one of said side walls as desired thereby allowing access to a row of terminals proximate the other side wall.

9. The connector and cover assembly of claim 8 wherein said pair of hinges are at opposite ends of a common member.

10. The connector and cover assembly of claim 8 wherein said housing further includes at least one protrusion extending outwardly from at least one of the end walls proximate the side wall opposite the hinged side wall, and said cover includes a protrusion receiving recess adapted to engage said housing protrusion to secure said cover to said housing when said cover is closed.

11. The connector and cover assembly of claim 8 wherein said cover further includes at least one alignment tab positioned along at least one of said side walls to align said cover to said base when said cover is being closed.

12. The connector and cover assembly of claim 8 wherein said elongate side of said cover along which said hinges extend, further includes at least one latching lip adapted to extend beneath a cooperating surface along said housing side wall when said cover has been pivoted to a closed position with respect to said housing, to latch said elongate side of said cover to said housing side wall, thus preventing said cover from being opened along the hinged side.

13. The connector and cover assembly of claim 12 wherein said cover includes a pair of latching lips, each one being proximate one of said hinge receiving slots.

14. The connector and cover assembly of claim 8 wherein at least one end of said cover further includes a downwardly projecting portion configured to cover an end of said hinge.

* * * * *